Nov. 28, 1961 R. E. SKATES 3,010,332
PULLEY LAGGING
Filed Dec. 8, 1958 2 Sheets-Sheet 1
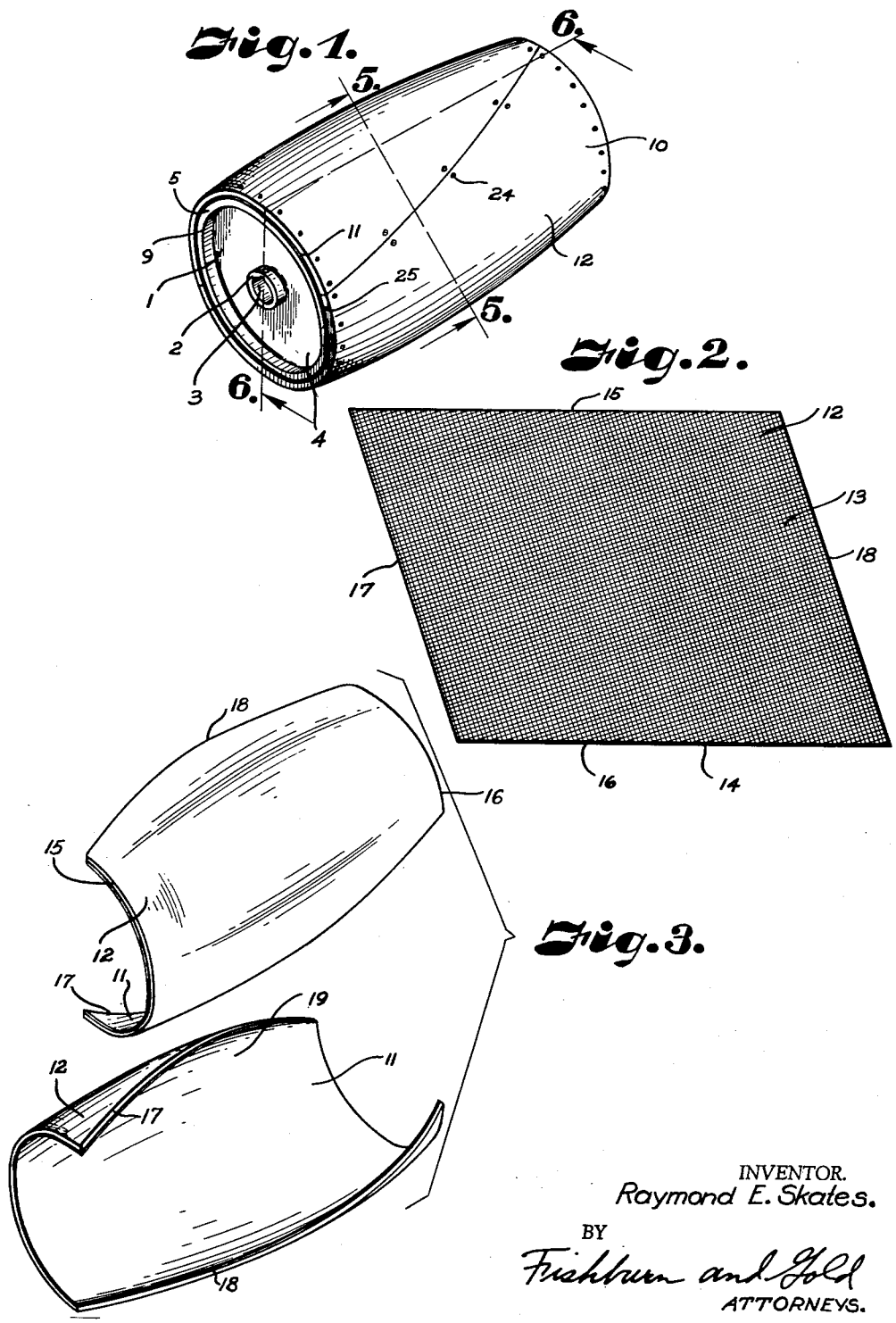
INVENTOR.
Raymond E. Skates.
BY
Fishburn and Gold
ATTORNEYS.

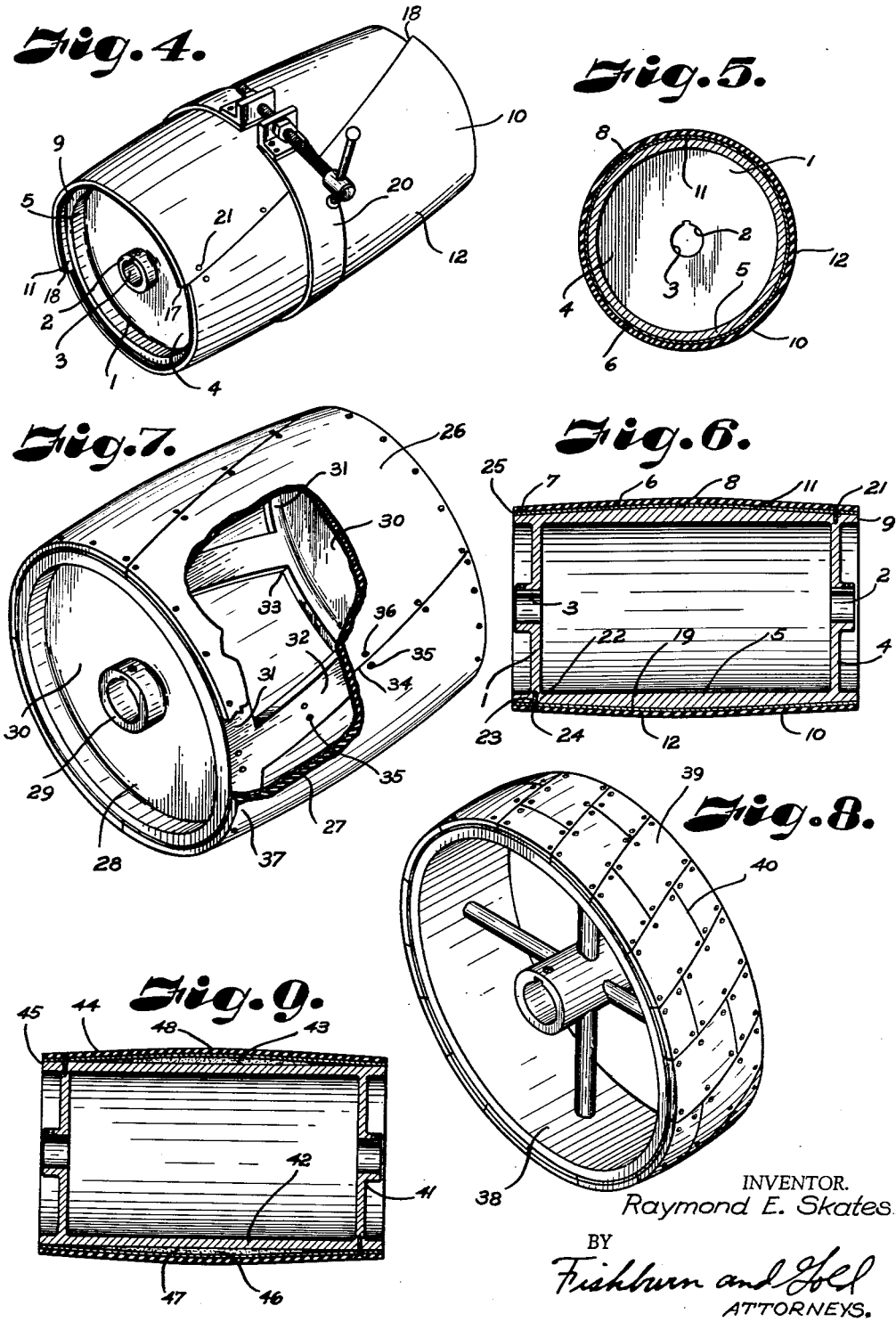

United States Patent Office 3,010,332
Patented Nov. 28, 1961

3,010,332
PULLEY LAGGING
Raymond E. Skates, 3101 E. Meyer, Kansas City, Mo.
Filed Dec. 8, 1958, Ser. No. 778,711
4 Claims. (Cl. 74—230.7)

This invention relates to rotary pulleys for belt drives, conveyors and the like, and more particularly to a replaceable lagging on such pulleys.

In belt conveyors, belt drives and the like, the pulleys over which the belts operate are frequently small in diameter relative to the belt size, and the frictional engagement between the pulley and belt is insufficient to properly drive the belt. Heretofore, driving and belt supporting pulleys have been provided with a resilient or rubber coating on the periphery of the pulley rim to produce increased frictional engagement between the pulley and belt. It is also common practice to provide the peripheral surface with a center crown whereby the end diameters are less than the intermediate diameter to maintain the belt on the pulley in aligned relation. The rubber coating on the pulley periphery may be arranged with good adherence to the rubber to the metal pulley by vulcanizing process, but such operations can be performed only in rubber vulcanizing plants and not in the field at the location of use of the pulley. Cementing of the rubber coating or lagging to the pulley periphery has not been successful and, therefore, in the field it has been common practice to apply lagging to the pulleys by using fabric with a rubber coating thereon cut in thin strips that are spiraled around the periphery of the pulley with the side edges of the strips abutting each other and securing the strips to the pulley by screws. This is a time-consuming operation and quite expensive. Also, in long use, the crown of the pulley can wear off, and it is difficult to restore the crown with the thin strip lagging.

The principal objects of the present invention are to provide a novel, replaceable pulley lagging in which a plurality of resilient coated metal sections are arranged in abutting relation to cover the pulley periphery; to provide a pulley frame with a sectional replaceable lagging with each section adjustable substantially corresponding to and forming a portion of the surface of a pulley and a resilient coating vulcanized on the outside surface of said sections whereby said coated sections are arranged and secured in abutting relation to form the pulley periphery; to provide a pulley with such a lagging shell secured thereto wherein the sections form a crowned periphery with a filler retained in between the shell and pulley surface to support said crown; to provide a novel means for establishing a new and subsequently replaceable lagging and crown for a belt-engaging pulley; to provide a preformed pulley lagging of rubber coated sheet metal sections which are clamped in edge abutting engagement and in covering relation to the pulley surface and then secured to said pulley; to provide such a pulley lagging in which the abutting edges of said lagging form even joints extending at an acute angle to the direction of travel of the belt, forming a spiral on the belt-engaging surface; to provide such a lagging in which the rubber covering is grooved to form a ribbed or roughened surface for increased frictional engagement between the pulley and belt; to provide a pulley with a sectional replaceable lagging that is effective, reliable, economical in use, easily replaced and simple in construction; and to provide a method for adjusting the inside diameter of the lagging shell to conform to the pulley size.

Other objects and advantages of this invention will become apparent from the following description taken in connection with the accompanying drawings, wherein are set forth by way of illustration and example certain embodiments of this invention.

FIG. 1 is a perspective view of a pulley, the surface of which is covered with a lagging embodying the features of the present invention.

FIG. 2 is a plan view of a pulley lagging section prior to forming.

FIG. 3 is a disassembled perspective view of formed lagging sections for a pulley such as illustrated in FIG. 1.

FIG. 4 is a perspective view of the lagging sections clamped on the pulley in edge abutting relation.

FIG. 5 is a transverse sectional view through the lagged pulley on the line 5—5, FIG. 1.

FIG. 6 is a longitudinal sectional view through the lagged pulley on the line 6—6, FIG. 1.

FIG. 7 is a perspective view of a lagged pulley with a plurality of lagging sections forming the periphery thereof with portions broken away to show the pulley frame.

FIG. 8 is a perspective view of a still larger pulley with a plurality of lagging sections secured thereto.

FIG. 9 is a longitudinal sectional view through a lagged pulley with a filler between the pulley surface and lagging sections to form a crown for said pulley.

Referring more in detail to the drawings:

1 designates a pulley of common form having hubs 2 with an axial bore 3 for reception of a shaft (not shown) for mounting the pulley. The hubs 2 have radially extending members 4 supporting a rim 5 which is generally cylindrical with the outer surface 6 convex or crowned, that is, the end diameters as at 7 are less than the intermediate diameter as at 8. The rim 5 terminates at opposite ends in edges 9. The outer surface 6 of the pulley rim 5 is covered by a plurality of lagging sections 10.

In the form of the invention illustrated in FIGS. 1 to 6 inclusive, the pulley is illustrated as being relatively small in diameter, and a shell of two formed lagging sections 10 cover the peripheral surface of said pulley. The lagging sections are formed of a lamination or plate of sheet metal 11 on the outer surface of which is vulcanized a resilient or rubber coating or layer 12. The plate of sheet metal may be solid, however, perforated metal may be used and it has the advantage of ease of rolling or forming to desired shape. The resilient or rubber coating 12 is bonded or vulcanized to the metal plate 11 while in flat sheets and the outer surface of said coating may be scored or ribbed as at 13, as illustrated in FIG. 2, to form a roughened surface. the rubber coated sheet metal is then cut to form a blank 14 of suitable size for forming the desired size section to be applied to the pulley. It is preferable that the blank 14 have a width between the end edges 15 and 16 slightly greater than the pulley length. The other edges 17 and 18 of the blank are preferably cut at an angle to the edges 15 and 16 which are parallel with the length of the blank such that when formed it will extend a suitable distance around the periphery of the pulley with the edges 17 and 18 each extending at an acute angle to one end edge of the pulley rim, forming a spiral on the belt-engaging surface. The blanks 14 are formed whereby the inner surface 19 of each blank substantially corresponds to the outer surface 6 of the pulley rim although it is apparent that the exact configuration of a worn pulley cannot be accurately predicted in advance. Then the formed sections 10 are arranged around the pulley rim with the edges 17 and 18 of one section abutting against the corresponding edges of another section. A suitable band clamp 20 is drawn around the lagging sections 10 to tighten same against the periphery of the rim of the pulley with the angular edges 17 and 18 of adjacent sections abutting, as illustrated in FIG. 4. Due to the angular or spiral arrangement of the edges 17 and 18, and the sections being longer than the pulley, the lagging sections will accommodate some variation in outside diameter of the pulley, the adjacent edges 17 and 18 moving laterally relative to each other to maintain the respective sections abutting while adjusting the inside diameter of the lagging shell, as illustrated in FIG. 4. While in such clamped condition, a plurality of spaced holes 21 are drilled through the lagging sections adjacent the edges thereof and into the rim of the pulley, as at 22, and suitable drive screws 23 having a head 24 larger than the holes 21 are driven therein to anchor the lagging sections to the pulley. The drive screws 23 are driven inwardly into the holes 21 and 22 sufficiently whereby the head 24 compresses the rubber coating to effect substantial engagement of the head with the metal portion of the section. Also, the drive screw heads 24 are of less thickness than the thickness of the rubber coating 12 whereby said screw heads are below the surface of the coating. After a suitable number of screws are driven into the holes 21 adjacent the edges of the sections, as illustrated in FIG. 1, to securely anchor the sections to the pulley rim, the clamp 20 is removed.

After the clamp 20 is removed, the portions of the lagging sections extending beyond the rim ends 9 are removed, whereby the ends 25 of the finished lagging are flush with the ends 9 of the rim, as illustrated in FIGS. 1 and 6.

In making and using pulley lagging constructed and assembled on a full pulley rim as described, the rubber or resilient covering in the form of a sheet of, for example, ⅛ to ¼ of an inch in thickness, is vulcanized on flat sheet metal stock to make a substantially permanent bond between the rubber coating and metal sheet. The sheet metal of such lagging may be of suitable thickness, for example, 22 to 14 gauge, whereby it can be easily formed and will retain its shape. However, the thickness of both the coating and metal sheet may be thicker or thinner depending upon the necessary strength for a particular application. The coating of the sheets may be accomplished in large rubber plants where adequate production machinery is available, and then shipped to a suitable point of processing wherein the sheets are cut to desired shaped blanks and then formed in presses or rolls to make a plurality of sections to fit a standard diameter and length of pulley, and since each set of sections will accommodate some variety of sizes, the number of different sizes of sections required to be kept on hand for a large number of pulley sizes is relatively small. When the pulley is worn or the lagging thereon worn, the lagging sections are applied to the pulley as above described. The pulley is then placed in use until the rubber coating on the lagging sections is worn to the point that it needs to be replaced, and then the screws 23 are removed and the lagging sections taken from the pulley and new sections applied thereto. This operation can be very quickly done, reducing the cost of lagging the pulley and also reducing the time that the machinery on which the pulley operates must be down for the lagging replacement.

In the form of the invention illustrated in FIG. 7, the lagging sections 26 form the peripheral member 27 of the pulley 28. In many conveyor installations, such as small package conveyors and other installations, the pressure of the belt on the pulley surface is relatively small whereby light weight pulley structures may be used. In the form of the invention illustrated, there are spaced hub members 29 each having radially extending members 30 supporting rims 31. Bars 32 are spaced circumferentially and extend between the rims 31 with the ends of said bars 32 connected to said rims. The hub members 29, radial members 30, rims 31 and bars 32 are secured together and cooperate to form the pulley frame 33. The bars 32 are preferably equally spaced and extend at an acute angle to one rim. The lagging sections 26 are of the same construction as shown and described in connection with FIGS. 1 to 6 inclusive with the sections of a circular length whereby the edges 34 abut against the corresponding edges of the adjacent section. Also, the edges 34 preferably are arranged along the bars 32 midway the width thereof. A plurality of spaced holes 35 are drilled into the margins of the sections 26 adjacent the edges 34 and into the bars 32 underlying same. Drive screws or other suitable fasteners 36 are secured in the holes to fasten the section 26 to the frame 33 whereby the rubber coating 37 of the sections 26 is the peripheral face of the pulley. In the illustrated form, four sections form the pulley periphery, however, any desired number of sections may be used providing there is a bar 32 underlying each abutting edge of the sections.

In the form of the invention illustrated in FIG. 8, the pulley 38 is of a larger type wherein a plurality of relatively smaller sections 39 of lagging material is applied thereto. Also, the length of the pulley may be such that it is impractical or undesirable to have the sections extend completely across the face thereof whereby a plurality of different size sections are utilized and arranged whereby the joint 40 is spaced laterally from the center line or midpoint between the ends of the pulley rim. Each of the lagging sections is constructed and formed in substantially the same manner as illustrated and described relative to the structure in FIGS. 1 to 6 inclusive, and said sections are clamped in place and secured by screws in the same manner.

In the form of the invention illustrated in FIG. 9, the pulley 41 has a rim 42 with an outer or peripheral face 43 that is cylindrical or of otherwise less crown than desired whereby the application of the standard crowned pulley lagging sections 44 would engage the pulley rim at the ends 45 but be spaced away in the intermediate portions to form a cavity 46. The cavity 46 is filled with a suitable filler 47 to support the lagging sections at the desired crowned condition. It is preferable that the pulley be coated with a suitable filler such as wood fiber and silica soda, or suitable synthetic resins or glass fiber reinforced resin. The filler is applied to the periphery of the pulley and shaped whereby the outer surface 48 has the desired crown for the pulley. Then the lagging sections are clamped on the pulley and the lagging and pulley rim drilled and screws applied to secure the lagging sections on the pulley.

It is preferred that the outer surface of the rubber coating of the lagging sections in each form of the invention be grooved to form a tread and where the belt operates under wet conditions the grooves can be of a type to let the water out at the sides. However, while the grooved or ribbed surface is desirable, a smooth outer surface of the rubber may be utilized. The pulley shells or lagging may be in two or more segments to extend around the pulley, and in wide pulleys there may be more than one segment across the width. Also, the edges of each of the lagging sections or segments are inclined relative to the direction of travel of the belt whereby the joints need not be exactly even or flush.

It is to be understood that while I have illustrated and described certain forms of my invention, it is not to be limited to the specific forms or arrangements of parts herein described and shown except insofar as such limitations are included in the claims.

What I claim and desire to secure by Letters Patent is:

1. A belt driving pulley comprising, in combination, a pulley frame having axial hubs and spaced rims with a plurality of circumferentially spaced transverse bars connecting said rims, a removable lagging on said pulley frame and consisting of a shell extending around the pulley frame in covering relation thereto, said shell consisting of a plurality of adjacent lagging sections each having a sheet metal layer with an inner surface substantially corresponding in shape to a respective portion of a crowned pulley whereby the end edges of said sections engage the pulley rim at the end edges thereof and the transverse edges of said sections lie along the transverse bars of the pulley frame, said lagging sections each having an outer surface covered with a layer of resilient rubber vulcanized thereon to form a belt-engaging surface, said lagging sections each having said transverse edges abutting with the next adjacent section with said abutting edges forming spirals, and a plurality of fastening means spaced along the lagging section edges and extending into the pulley frame to secure the lagging sections thereto.

2. A lagged pulley comprising, a pulley frame having spaced rims connected by a plurality of circumferentially spaced bars, a shell adapted to be secured to the pulley frame in covering relation thereto, said shell consisting of a plurality of lagging segments each having a sheet metal inner layer and an outer layer of rubber vulcanized thereto to form a belt-engaging surface, said lagging segments on the shell having abutting edges each of which are at the same acute angle to one end of the pulley frame, said abutting edges forming spirals on said belt-engaging surface whereby lateral relative movement of said edges adjusts the inside diameter of said shell to conform to the size of the pulley frame, and means securing said segments in their said conforming adjusted position to the pulley frame.

3. Replacement lagging for belt driven pulleys comprising, a shell of variable inside diameter adapted to be secured to a pulley in covering engagement with the outer surface thereof; said shell comprising, a plurality of segments arranged in circumferentially spaced relation, each segment having opposed edges abutting edges of adjacent segments, said abutting edges forming spirals, whereby lateral relative movement of said abutting edges adjusts said inside diameter to conform to the diameter of said pulley surface.

4. The method of mounting a lagging shell on a belt driven pulley wherein said shell is composed of a plurality of adjacent segments having abutting edges forming spirals; comprising the steps of moving said abutting edges laterally relative to each other until the inside diameter of said shell substantially conforms to the peripheral size of said pulley, holding said shell segments in adjusted position on the pulley and drilling aligned holes through the shell segments adjacent said abutting edges and into said pulley, and inserting fastening devices into said aligned holes to secure said segments to said pulley.

References Cited in the file of this patent

UNITED STATES PATENTS

| | | |
|---|---|---|
| 1,560,524 | Avery | Nov. 10, 1925 |
| 1,636,492 | Taylor | July 19, 1927 |
| 2,707,403 | Thomson et al. | May 3, 1955 |